United States Patent [19]

Shirasu et al.

[11] Patent Number: 4,653,801
[45] Date of Patent: Mar. 31, 1987

[54] SEALING STRUCTURE FOR AN AUTOMOTIVE VEHICLE

[75] Inventors: Chikao Shirasu; Hideo Sakai; Yasutaka Innami, all of Utsunomiya, Japan

[73] Assignee: Honda Giken Kogyo Kabushiki Kaisha, Tokyo, Japan

[21] Appl. No.: 813,282

[22] Filed: Dec. 24, 1985

[30] Foreign Application Priority Data

Dec. 25, 1984 [JP] Japan .............. 59-201836[U]
Dec. 25, 1984 [JP] Japan .............. 59-201838[U]

[51] Int. Cl.⁴ .............................................. B62D 25/00
[52] U.S. Cl. ...................................... 296/202; 296/93; 296/213; 49/490
[58] Field of Search .............. 296/146, 213, 93, 202; 49/490, 491, 498

[56] References Cited

U.S. PATENT DOCUMENTS

| | | | |
|---|---|---|---|
| 4,378,130 | 3/1983 | Shimizu | 296/146 |
| 4,409,756 | 10/1983 | Audenino | 49/490 |
| 4,444,428 | 4/1984 | Iwakura | 296/213 |
| 4,494,790 | 1/1985 | Omura | 296/213 |
| 4,496,186 | 1/1985 | Tuchiya | 296/146 |
| 4,518,197 | 5/1985 | Gallitzendörfer | 296/213 |

Primary Examiner—Robert R. Song
Attorney, Agent, or Firm—Armstrong, Nikaido, Marmelstein & Kubovcik

[57] ABSTRACT

A sealing structure for an automotive vehicle comprising a drip seal attached to a flange formed along the vehicle body roof and the vehicle body front pillar and shutting off the clearance along the front pillar between the vehicle body and the vehicle door. The drip seal has two ridges forming inner and outer lips, the outer lip being held in abutting contact with an inner face of the door. The inner lip extends along the vehicle body roof parallel to and spaced from the outer lip and forming with the outer lip an upwardly opened drip channel. The front tip edge of the door sash and the front pillar abut the opposite longitudinally extending sides of the inner lip along the front pillar and shut off the clearance between the door sash and front pillar substantially flush with the outer surface of the vehicle.

3 Claims, 3 Drawing Figures

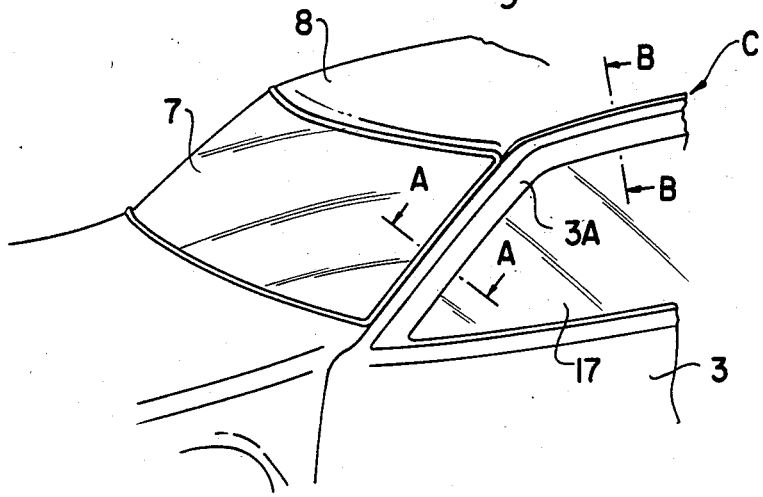
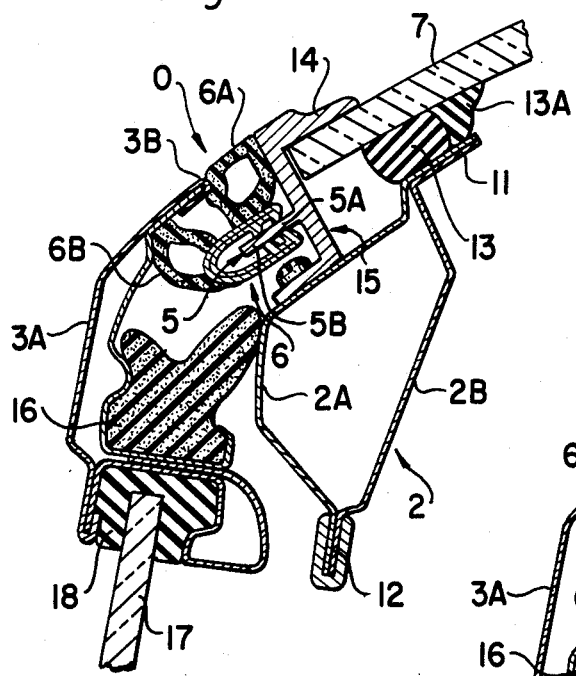
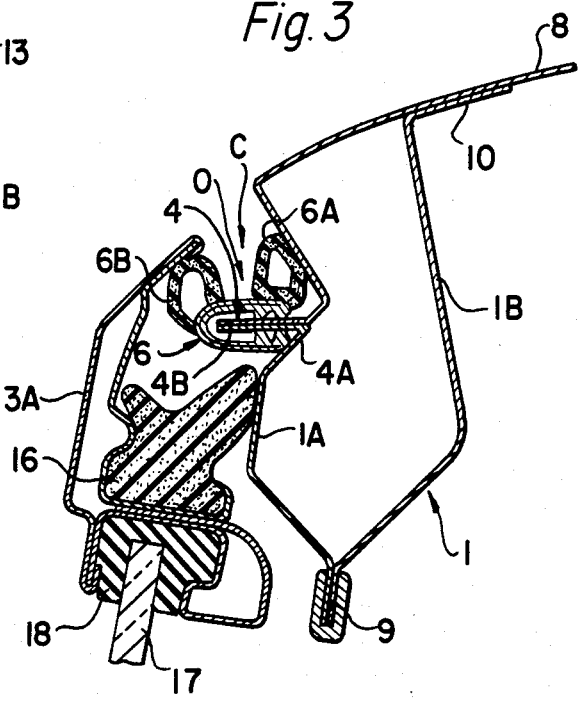

SEALING STRUCTURE FOR AN AUTOMOTIVE VEHICLE

BACKGROUND OF THE INVENTION

The present device relates to a sealing structure for an automotive vehicle and, more particularly, to a sealing structure for reducing noises due to wind, in which a drip seal having an identical section and extending along the side of a roof and along the side of a front pillar is formed at the side of the roof into a drip channel for receiving rain droplets and at the side of the front pillar is formed into a seal for sealing the clearance between the front pillar and the front tip of the vehicle door when the door is closed.

A sealing structure, in which the clearance between the front pillar and door sash of an automotive vehicle is shut off by means of a seal, is disclosed in U.S. Pat. No. 4,496,186, dated Jan. 29, 1985. According to such patent, the seal is formed with upper and lower lips contacting simultaneously with the inner face of the door sash. The gap between the automotive body and the front tip of the door sash is shut off at the portion of the upper lip extending along the front pillar, to establish a substantially continuous external surface to improve the aerodynamics of the vehicle. Such seal, however, fails to take into consideration the function of a rain trapping gutter at the roof. In the case of much rainfall, therefore, the water may overflow the gutter onto the side door window to hamper sideway visibility from the vehicle interior.

SUMMARY OF THE INVENTION

The present invention solves the aforementioned problem by providing a sealing structure for an automotive vehicle for improving the aerodynamics of the vehicle at the front tip of the door sash and front pillar and enlarges the rainfall run-off capacity at the side of the roof. All of this is accomplished, in the present invention, with a simple construction which is easily attached.

In the present invention, a sealing structure for an automotive vehicle is provided which is attached to a flange formed along the vehicle body roof and the front body pillar extending from the roof down and along the side of the windshield. A drip seal having two ridges, forming inner and outer lips, is attached to the flange to shut off the clearance along the front pillar between the vehicle body and the vehicle door when the door is closed. The outer lip of the drip seal is held in abutting contact with an inner face of the vehicle door while the inner lip extends along the vehicle body roof parallel to and spaced from the outer lip and forming with the outer lip an upwardly opened drip channel. The front tip edge of the door sash and the front pillar are in abutting contact with the opposite longitudinally extending sides of the inner lip along the front pillar and shut off the clearance between the door sash and the pillar. The outer side of the inner lip between the door sash and the pillar is substantially flush with the outer surface of the vehicle body. The inner lip is brought into abutting contact with the front top edge of the door, when the door is closed to cover the front top edge of the door and form a smooth aerodynamic surface between the front body pillar and the front door edge. The flange along the roof is secured to the vehicle at a greater distance from the body outer surface than the distance of the flange base from the body outer surface at the front body pillar.

DESCRIPTION OF DRAWINGS

The invention of the present application will be more fully described and better understood from the following description, taken with the appended drawings, of a preferred embodiment of the invention, in which FIG. 1 is a perspective view of the roof, front pillar and front portion of the door of an automotive vehicle to which the present invention is applied;

FIG. 2 is a section taken in the direction of the arrows at A—A FIG. 1; and

FIG. 3 is a section taken in the dirction of the arrows at B—B FIG. 1.

DESCRIPTION OF THE PREFERRED EMBODIMENT

Referring to the drawings, roof side rail 1, FIG. 3 is constructed integrally with the roof panel 8 by welding a rail outer member 1A and a rail inner member 1B to the side ends of the proof panel 8 with the ends of panel 8 and member 1A protruding outwardly to form portion 4 of flange 4, 5. The ends of members 1A and 1B protrude downwardly and are joined at 9, while, at its other end, member 1B extends outwardly and is welded to the inner side of roof panel 8. Roof side rail 1 is formed to have a box-shaped section. Outwardly protruding flange portion 4 is arranged, generally horizontally, for attachment of drip seal 6 as hereinafter described.

Front pillar 2, FIG. 2, is formed to have a box-shaped section by welding a pillar outer member 2A and a pillar inner member 2B at front and rear flanges 11 and 12. Windshield 7 has its peripheral back adhered and fixed to the front face of front flange 11 by means of an adhesive 13 secured to dam rubber 13A for preventing adhesive 13 from oozing out. On the outer side of pillar 2, at outer member 2A, there is secured a member 15 having formed integrally thereon drip seal mounting flange portion 5 and a lace 14 retaining the edge of windshield 7. Flange portion 5 protrudes obliquely backward and is aligned with flange portion 4 extending along the aforementioned roof side rail 1.

Drip seal 6 is fitted from the outside on flange portion 5 extending along front pillar 2 with its inner lip 6A held in close contact with the outer side of the pane retaining lace 14.

Drip seal 6 can be integrally manufactured by extrusion-molding its clip-shaped base and inner and outer lips 6A and 6B or lips 6A and 6B may be made of a soft material having an excellent resiliency, such as formed rubber, or formed, as shown, into hollow, elastic lips.

Pane retaining lace 14 and the drip seal mounting flange portion 5, in the preferred embodiment, are made integral, the latter of which may protrude integrally with the pillar outer member 2A.

Referring to the FIGS. 2 and 3, drip seal 6, is attached to flange portion 4 and 5 extending along the sides of roof side rail 1 and front pillar 2. Seal 6 is formed with two ridges, one forming inner lip 6A and the other forming outer lip 6B. The inner surface of door sash 3A is brought into abutting contact with outer lip 6B, FIGS. 2 and 3. Inner lip 6A is formed at its portion extending along the roof side rail 1, FIG. 3, with an upward drip channel C which extends between the inner and outer lips 6A and 6B. A door sash front tip 3B, FIG. 2, is held in abutting contact with the inner lip 6A to shut off the clearance between windshield 7 and door sash front tip 3B such that windshield 7 and door sash front tip 3B, FIG. 2, lie substantially flush with each other. Inner lip 6A is deformed to cover front tip 3B of the door sash 3A, which comes into contact with lip 6A when door 3 is closed.

Drip seal 6 is attached to flange portion 4, 5 formed to extend along the sides of roof side rail 1 and front pillar 2. Flange portions 4 and 5 are provided with mounting bases 4A, and 5A and free ends 4B, 5B, respectively. The base 4A of the flange extends along the roof and is arranged at a larger spacing from a clearance entrance 0 between the automotive body and door than the base 5A of the flange extending along front pillar 2. As a result, at the portions extending along the roof side rail 1, the inner and outer lips 6A and 6B of the drip seal 6 are spaced apart, are open and are directed upward to form drip channel C therebetween. At the portions extending along the front pillar 2, the inner lip 6A protrudes more than the outer lip 6B and comes into abutting contact with the front tip 3B of the door sash 3A when door 3 is closed.

When door 3 is closed, as shown in FIG. 2, the front tip 3B of the door sash 3A comes into contact with the inner lip 6A extending along the front pillar 2 to shut off the clearance between the side edge of windshield 7 and the door sash front tip 3B thereby to establish the flash surface from windshield 7 to the door sash 3A. On the other hand, the inner face of the upper door sash 3A, FIG. 3, contacts the outer lip 6B providing the outer side wall of open drip channel C. The rain droplets flowing sideway of roof panel 8 will be trapped by the drip channel C so that they are permitted to flow only in the longitudinal directions.

When the door 3 is closed, as is better seen from FIG. 2, and as already described, the front tip 3B of the door sash 3A comes into contact with the inner lip 6A to deform and bite into lip 6A so that the door sash front tip 3B is covered with lip 6A.

To the inner side of the door sash 3A, FIGS. 2 and 3, there is attached a door weatherstrip 16 which comes into the roof side wall 1 and the front pillar 2 to seal the door 3 when the door is closed. Thus, when the door 3 is closed, the automotive compartment is doubly sealed at its portion extending along the roof side rail 1 by the outer lip 6B and the door weatherstrip 16 and is triply sealed at its portion extending along the front pillar 2 by the inner and outer lips 6A and 6B and the door weatherstrip 16 so that it can stand against the strong wind pressure it is receiving directly while the vehicle is moving. Reference numerals 17 and 18, FIGS. 2 and 3 indicate a door pane and a run channel, respectively, for the door pane.

The functions of seal 6 in forming a drip channel extending along the roof side rail 1 and a flash surface between the front pillar 2 and the door 3 are achieved with a single seal 6 of identical section merely by changing the mounted of the respective sides of the seal at the roof side rail 1 and the front pillar 2 with mounting flange portions 4 and 5. As a result, the body structure for forming the drip channel and for preventing noises due to the wind is simplified. Seal 6 is easily attached and the cost of body assembly is reduced. Moreover, the drip channel C is formed between the inner and outer lips 6A and 6B of the drip seal 6 so that the rainfall trapping capacity can be increased.

If the structure is made, as in the shown embodiment, to have the hollow, elastic inner lip 6A, deformed to cover the front tip of the door sash 3A coming into contact when the door 3 is closed, the hollow, elastic lip 6A of the seal 2 is easily allowed to be deformed and to profile the door sash front tip 3B, even if the front tip 3B is dislocated upon the closure of the door 3. Thus, it is possible to ensure the sealing property and to prevent chipping of front tip 3B by pebble or the like otherwise hitting the tip, if exposed.

The terms and expressions which have been employed in the foregong description are used as terms of description and not of limitation, and there is no intention, in the use of such terms and expressions, of excluding any equivalents of the feature shown and described or portions thereof, but it is recognized that various modifications are possible within the scope of the invention claimed.

What is claimed:

1. A sealing structure for an automotive vehicle comprising: a drip seal attached to a mounting flange formed along the roof rail outer member of a vehicle body roof and continuing along a member mounted on the vehicle body front pillar to shut off the clearance between said member mounted on the front pillar and a vehicle door, said drip seal having two ridges forming inner and outer lips, said outer lip being held in abutting contact with the inner face of the vehicle door, said inner lip extending along said vehicle body roof parallel to and spaced from said outer lip and forming with said outer lip an upwardly opened drip channel, the front tip edge of said door and said member mounted on said front pillar being in abutting contact with the opposite longitudinally extending sides of said inner lip along said member mounted on said front pillar and shutting off the clearance between said door sash and said member mounted on said front pillar substantially flush with the outer surface of said vehicle body.

2. A sealing structure, as repeated in claim 1, in which said flange is secured in said vehicle with the base of the flange along said roof at a distance from said vehicle body outer surface greater than the distance of the base of the flange along said member mounted on said front body pillar from said body outer surface.

3. A sealing structure, as recited in claim 1, in which said inner lip is brought into abutting contact with the front tip edge of said door, when said door is closed, and covers said front tip edge of said door.

* * * * *